(12) United States Patent
Vasudevan et al.

(10) Patent No.: US 8,924,492 B2
(45) Date of Patent: Dec. 30, 2014

(54) METHOD AND SYSTEM FOR GENERATING RECIPIENTS WHILE COMPOSING ELECTRONIC MAILS

(75) Inventors: Sudharsan Vasudevan, Sunnyvale, CA (US); Hemanth Sambrani, Bangalore (IN); Ankit Deepak Shah, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 257 days.

(21) Appl. No.: 13/481,854

(22) Filed: May 27, 2012

(65) Prior Publication Data

US 2013/0318175 A1 Nov. 28, 2013

(51) Int. Cl.
*G06F 15/16* (2006.01)
*H04L 12/58* (2006.01)

(52) U.S. Cl.
CPC ........... *H04L 51/22* (2013.01); *H04L 51/28* (2013.01)
USPC ........................................................ 709/206

(58) Field of Classification Search
CPC .............. H04L 61/1594; H04L 29/12198; H04L 29/12122; H04L 61/1564; H04L 51/28; H04L 51/22; H04L 51/00
USPC ........................................................ 709/206
See application file for complete search history.

(56) References Cited

U.S. PATENT DOCUMENTS

| | | | | |
|---|---|---|---|---|
| 2004/0096043 | A1* | 5/2004 | Timmins et al. | 379/88.22 |
| 2007/0288578 | A1* | 12/2007 | Pantalone | 709/206 |
| 2007/0299924 | A1* | 12/2007 | Tremblay | 709/206 |
| 2008/0071873 | A1* | 3/2008 | Gross | 709/206 |
| 2009/0177754 | A1* | 7/2009 | Brezina et al. | 709/206 |
| 2010/0299397 | A1* | 11/2010 | Sambrani et al. | 709/206 |

* cited by examiner

*Primary Examiner* — Krisna Lim
(74) *Attorney, Agent, or Firm* — James J. DeCarlo; Greenberg Traurig, LLP (57) ABSTRACT

A computer-implemented method of generating recipients while composing electronic emails includes identifying a trigger from a user in response to the user composing an electronic mail (email). The computer-implemented method also includes receiving one or more alphabets subsequent to the trigger. The alphabets imply a recipient of the email. Further, the computer-implemented method includes fetching email addresses comprising the one or more alphabets from an address book corresponding to the user. Furthermore, the computer-implemented method includes displaying a list of the email addresses to the user. Moreover, the computer-implemented method includes filling appropriate fields in response to the user selecting one of the email addresses.

25 Claims, 6 Drawing Sheets

METHOD AND SYSTEM FOR GENERATING RECIPIENTS WHILE COMPOSING ELECTRONIC MAILS

TECHNICAL FIELD

Embodiments of the disclosure relate generally, to communications and more specifically, to generate recipients while composing electronic mails.

BACKGROUND

An essential mode of communication today is by electronic mails (emails). Typically, while a user composes an email, the user is asked to key in email addresses related to recipients in different fields, for example To, Cc, Bcc and a subject of the email. Subsequently, the user composes a message in a body of the email.

Often, the user is observed to spend time in keying the email addresses. Time and again, the user ensures that the email addresses are accurate. Consequently, attention of the user is diverted towards the email addresses when essentially the message is important. Moreover, composing the emails become tedious and complicated for the user when the emails are to be sent to groups of recipients.

In light of the foregoing discussion, there is a need for an efficient method and system for generating recipients while composing emails.

SUMMARY

The above-mentioned needs are met by a computer-implemented method, computer program product, and system for generating recipients while composing electronic mails.

An example of a computer-implemented method of generating recipients while composing electronic mails includes identifying a trigger from a user in response to the user composing an electronic mail (email). The computer-implemented method also includes receiving one or more alphabets subsequent to the trigger. The alphabets imply a recipient of the email. Further, the computer-implemented method includes fetching email addresses comprising the one or more alphabets from an address book corresponding to the user. Furthermore, the computer-implemented method includes displaying a list of the email addresses to the user. Moreover, the computer-implemented method includes filling appropriate fields in response to the user selecting one of the email addresses.

An example of a computer program product stored on a non-transitory computer-readable medium that when executed by a processor, performs a method of generating recipients while creating electronic mails includes identifying a trigger from a user in response to the user composing an electronic mail (email). The computer program product includes receiving one or more alphabets subsequent to the trigger. The alphabets imply a recipient of the email. The computer program product also includes fetching email addresses comprising the one or more alphabets from an address book corresponding to the user. Further, the computer program product includes displaying a list of the email addresses to the user. Moreover, the computer program product includes filling appropriate fields in response to the user selecting one of the email addresses.

An example of a system of generating recipients while creating electronic mails includes a web interface. The web interface receives one or more alphabets in response to a user composing an electronic mail (email). The system also includes an identifying module that identifies a trigger from the user. Further, the system includes a retrieving module that retrieves email addresses of recipients from an address book corresponding to the user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

A computer-implemented method, computer program product, and system for generating recipients while composing electronic mails are disclosed. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
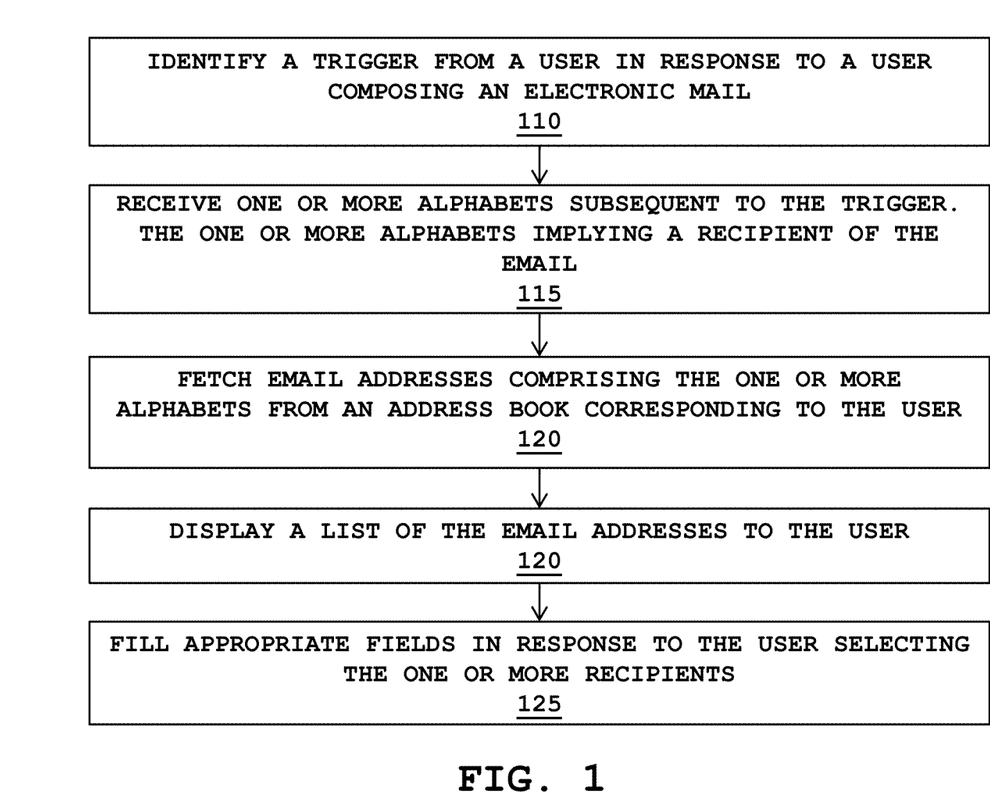
FIG. 1 is a flow diagram illustrating a method of generating recipients while composing electronic mails, in accordance with one embodiment.

FIG. 1 is a flow diagram illustrating a method of generating recipients while composing electronic mails, in accordance with one embodiment.

At step 110, a trigger is identified from a user in response to a user composing electronic mails (emails).

Time and again, the user desires to send emails to recipients by entering an appropriate Uniform Resource Locator (URL) of a website in a web browser. The website is dedicated to provide email services to the user. Examples of the website include, but are not limited to, Hotmail, Gmail, AOL and Yahoo. The web browser can be a desktop web browser (for example, Internet Explorer, Mozilla, or Chrome), a mobile browser, or a web viewer built into an application program. In some embodiments, the user can access one of a webmail and an email client to send and receive emails in other devices, for example, mobiles and tablets.

Subsequently, a web page is displayed to the user for composing a message. The web page hides fields pertaining To, Cc, Bcc and subject to the user. Consequently, the user experiences a plain web interface with only a text field to compose the message.

In one embodiment, the web page includes a visual indicator, for example, an icon, to enable the user to view the fields hidden when desired.

The user now begins to compose a message by entering a salutation. Examples of the salutation includes, but is not limited to, Hi, Hello, Dear, Mr, Mrs and Dr. Following the salutation, the user enters a trigger for example '@', in the body of the email or subject, for example, 'Hi @'. The trigger implies that the user is going to enter a recipient's name after the trigger and within the body of the email. The trigger can be any other symbol other than '!' and '+' signs. Further, the trigger is identified.

Further, an address book of the user is retrieved from a database while the user composes the email.

At step 115, one or more alphabets are received subsequent to the trigger. The alphabets imply a recipient of the email.

Following the trigger, the user enters an alphabet, for example, 'M'. The user can continue to enter further alphabets, for example, 'Mark'. 'Mark' signifies as the recipient of the email being composed.

Words can also be received subsequent to the trigger. For example, 'Hi A, B, C' indicates that the A, B and C are a group of recipients. In some embodiments, parenthesis, greater and less than symbols (< >) and quotes (' ') can also indicate the group of recipients. For example, Hi <A, B, C>.

At step 120, email addresses including the one or more alphabets are fetched from an address book corresponding to the user.

The address book includes the email addresses of contacts that the user has established over earlier communications.

The email addresses that match up to the alphabets are fetched from a database that stores the address book. In some embodiments, a plurality of the email addresses is also fetched. In one example, for the alphabet 'm', the following email addresses matching 'm' are fetched and are as shown below:
markcharles@gmail.com,
matthew@yahoo.co.in, and
michelle@demon.co.uk.

Similarly, when the alphabets, 'muk' are received, all the alphabets are considered while fetching the email addresses, as shown below:
mukundnair@gmail.com,
mukanadas@yahoo.co.in.

The email addresses signifies the possibilities of the recipient.

At step 125, a list of the email addresses is displayed to the user.

A drop down with the list of the email addresses is displayed to the user. The list includes all the email addresses fetched.

In some embodiments, the list includes groups of email addresses. In such a case, there can be a separation between the group of email addresses and individual email addresses. Further, the user can also add one or more recipients to an existing group. For example, consider a group named as 'Joggers' consisting of members Bob, Mick and Alex. As the user enters 'Joggers', the list is displayed to the user. However, the user can now add a new member by entering 'Joggers+Sam'. Similarly, the user can also eliminate a member from a group. For example, 'Joggers−Mick'.

Further, the address book of the user is constantly updated.

Furthermore, the list of email addresses is based on recency and frequency of subsequent emails sent by the user. Recency is the time before present. Frequency is the number of times an email is sent to a particular recipient.

The user can create a list while composing the email. For example, the user enters the following in the body:
"Hi Sudha, Rohan, Hemanth (y42)"
In such a case, (y42) is recognized as a new list and corresponding email addresses are added into the list.
Consider another example:
The user enters in the 'To' field,
sudharsan.vasudevan@gmail.com,
   rohan.monga@ymail.com,     hemanth@sambrani.com (y42)
The parenthesized name is recognized as a list that needs to be created and adds the corresponding email addresses to the list.
However, if (y42) already exists, names those are not present in the list are appended.

At step 130, appropriate fields are filled in response to the user selecting one of the email addresses.

The user selects an email addresses from the list and presses an "Enter" key or clicks on an "OK" icon. Consequently, the email addresses will be automatically added to the appropriate field. In some embodiments, the user selects multiple email addresses.

Further, the list also includes email addresses corresponding to groups of recipients. In some embodiments, a name is assigned to the groups of recipients, for example, a group name "Joggers" includes email addresses of recipients "Hemanth, Sudharsan and Ankit". A demarcation, for example a line, can separate the group names from the email addresses of recipients in the list. The user can select a group name from the list. Consequently, appropriate fields are filled in response to the user selecting the group name.

The means by which the recipient receives the email can also be decided by the user. Typically, the fields are 'To', 'Cc', and 'Bcc'. The user can mention the fields just before the recipient. By default, the email address will be added to the 'To' field. For example, the user can mention 'Ccing Bob' and 'copying Bob' to indicate that the email address of Bob is to be filled in the 'Cc' field within the email. Further, specific words within the message of the email can also indicate the appropriate fields to be filled. Examples of the words include, but are not limited to, 'Please discuss with Bob copied in the mail', 'I am ccing Bob in the mail', 'I have copied Bob in this mail', and 'I am Bccing Bob in this mail'.

Consider the following scenarios:
1. The user starts to enter the message "Hi Suddha". "Suddha" is recognized as "sudharsan.vasudevan@gmail.com. Consequently, the 'To' field is filled with the email address.
2. The user starts to enter the message "Hi Joggers". "Joggers" is recognized as email addresses corresponding to a group of recipients. Consequently, the 'To' field is expanded and filled with the email addresses.

Further, the fields are not visible to the user. However, on enabling a visual indicator displayed on the web mail, the fields can be exposed to the user.

Anchor tags are also added in response to the user selecting the recipient. Anchor tags are Hyper Text Markup Language (HTML) code for creating a link to another web page or to a particular section within a web page. Once the recipient receives the email, the user can click on the anchor tag. Consequently, a new web page to compose an email will be opened.

Alternate names are inferred from the user and the recipient within the content of the email. Examples of the alternate names include, but are not limited to, nicknames, familiar names and shortened names of an actual name. An appropriate email address is then linked to the alternate name in the address book. For example, consider a salutation line as below:

"Hi Sudha"

"Sudha" is inferred as an alternate name of the recipient and will be associated with actual email address sudharsan.vasudevan@gmail.com. Further, the list includes the email addresses corresponding to the alternate names. Appropriate fields are filled when the user selects one of the alternate names.

Further, when the recipient receives an email from a sender, a signature will be associated with the sender's email address.

For example, consider a signature line as below:

"Regards, Hemanth"

"Hemanth" will be associated with the email address "hemanth@sambrani.com". Consequently, when the recipient enters "Hemanth" in an email, hemanth@sambrani.com will be displayed in a list.

Figure 2:
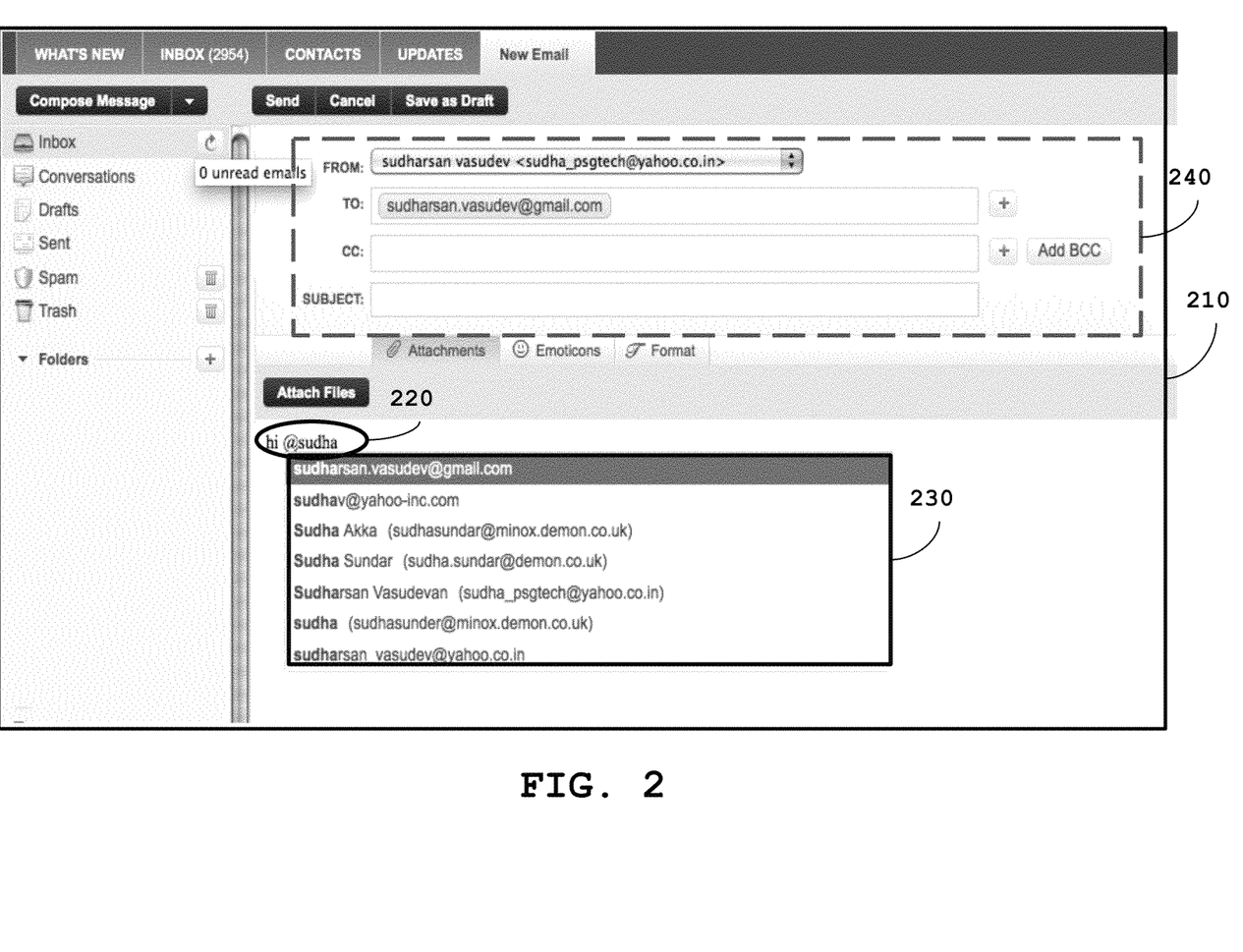
FIG. 2 is an exemplary representation of identifying a trigger in response to the user composing an email, in accordance with one embodiment.

FIG. 2 is an exemplary representation of identifying a trigger in response to the user composing an email, in accordance with one embodiment.

The user is displayed with a web page 210 to compose an email. Further, the user enters a salutation 'Hi' followed by a symbol '@'. The symbol '@' is identified as a trigger and implies that the user is entering a recipient's name. Subsequent to the trigger the user enters a recipient's name, 'sudha' as shown in 220. At this point, 'sudha' is recognized as the recipient, and email addresses matching to 'sudha' are retrieved from an address book stored in a database. The email addresses are then displayed to the user in a drop down box 230.

The user selects the intended recipient as 'sudharsan.vasudev@gmail.com' from the drop down box 230. By default, the email address is filled in the 'To' field 240. In one embodiment, the 'To' field 240 can be hidden.

Figure 3:
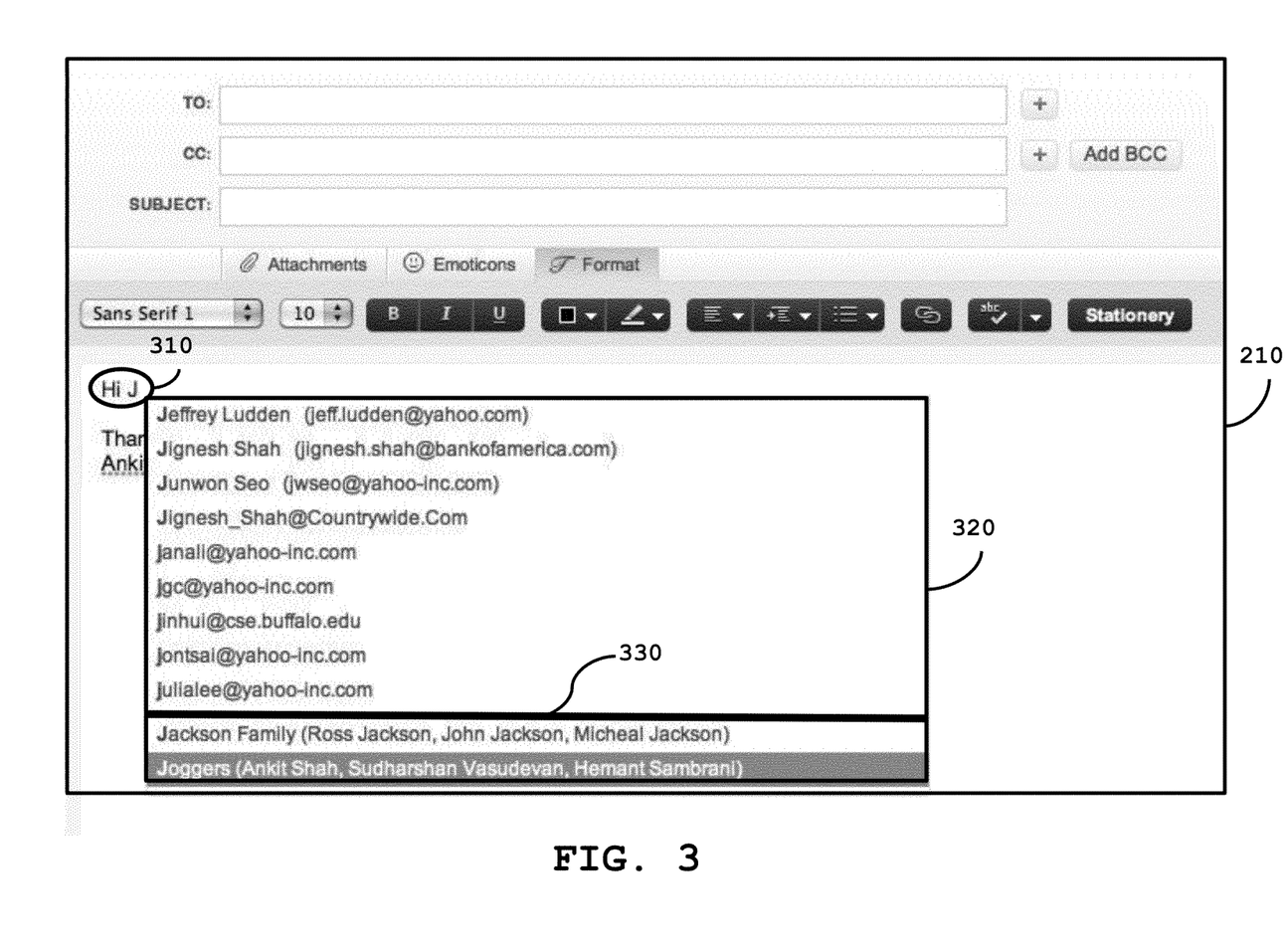
FIG. 3 is an exemplary representation of identifying a trigger in response to the user composing an email, in accordance with another embodiment.

FIG. 3 is an exemplary representation of identifying a trigger in response to a user composing an email, in accordance with another embodiment.

The user is displayed with the web page 210 to compose an email. The user enters a salutation followed by a capital letter 'J' as shown in 310. The salutation followed by the capital letter is identified as a trigger and implies that the user is entering a recipient's name. Email addresses matching to the letter 'J' is retrieved from the address book and are displayed in a drop down box 320. Typically, the drop down box 320 includes email addresses of individual recipients along with email addresses of a group of recipients. In one example, a line 330 partitions the individual recipients from the group of recipients.

The user then selects the group of recipients as 'Joggers (Ankit Shah, Sudharsan Vasudevan, Hemanth Sambrani)'. Corresponding email addresses of Joggers will be then retrieved from the address book and filled in the 'To' field.

Figure 4:
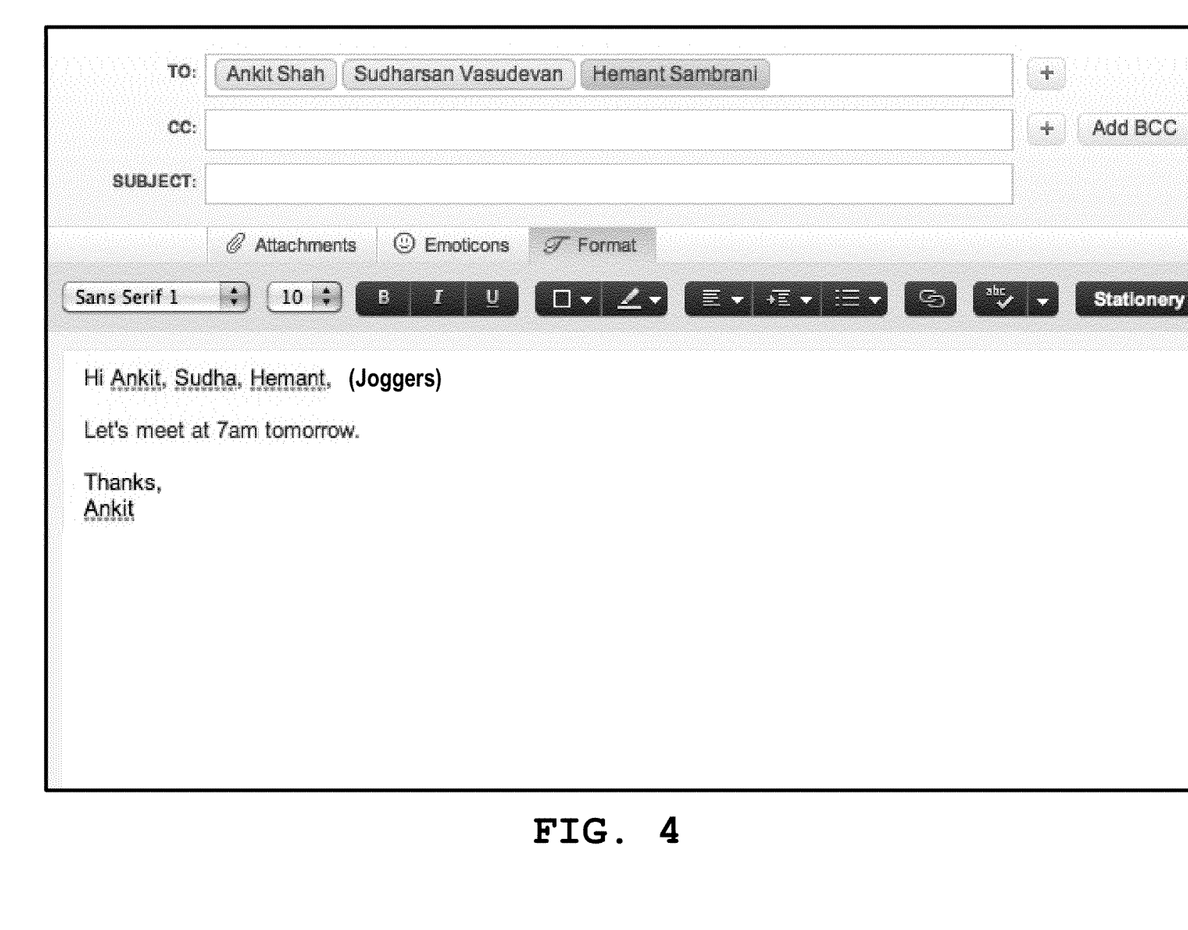
FIG. 4 is an exemplary representation of automatically creating groups of recipients, in accordance with one embodiment.

FIG. 4 is an exemplary representation of automatically creating the groups of recipients, in accordance with one embodiment.

The user enters a salutation 'Hi' and further enters multiple recipients as 'Ankit, Sudha, Hemanth'. The multiple recipients are now recognized as Joggers created in FIG. 3. Further, the email addresses are filled in the 'To' field. However, the names of Joggers are shown to the user in the 'To' field.

Figure 5:
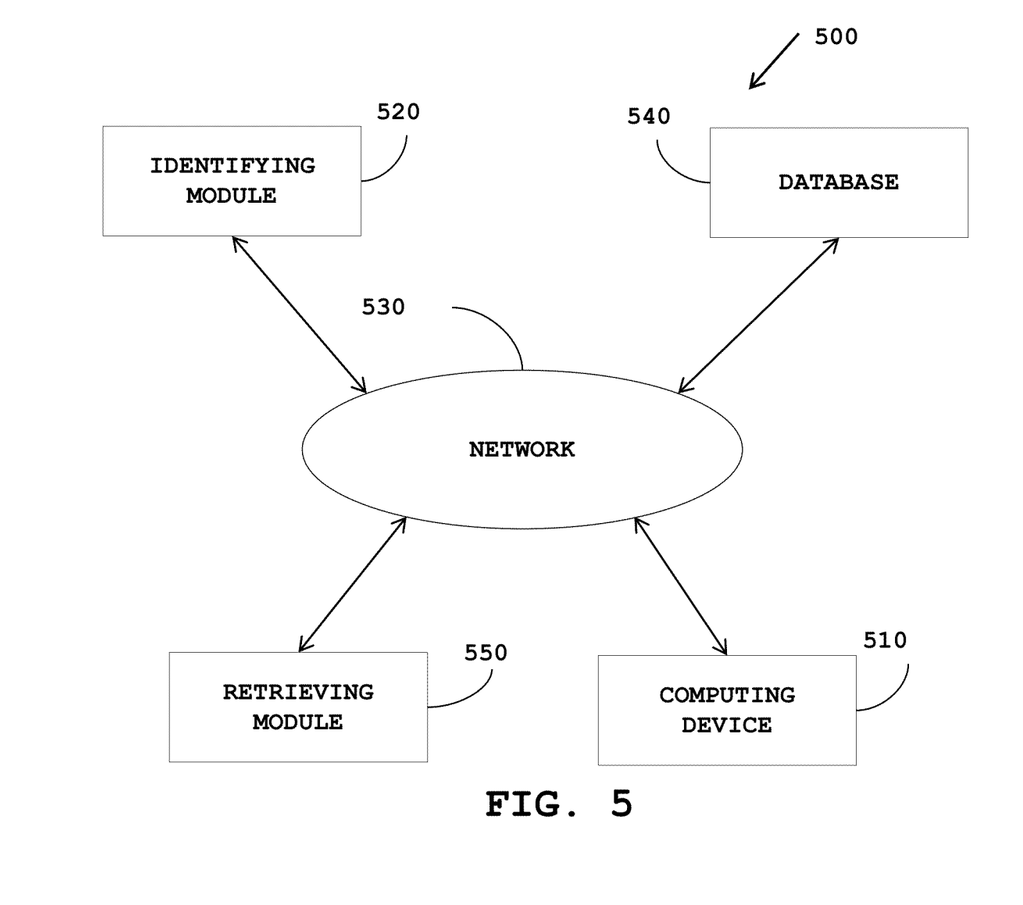
FIG. 5 is a block diagram illustrating a system of generating recipients while creating electronic mails, in accordance with one embodiment.

FIG. 5 is a block diagram illustrating a system of generating recipients while composing electronic mails, in accordance with one embodiment.

The system 500 can implement the method described above. The system 500 includes a computing device 510, an identifying module 520, a database 540, and a retrieving module 550 in communication with a network 530 (for example, the Internet or a cellular network).

Examples of the computing device 510 include, but are not limited to, a Personal Computer (PC), a stationary computing device, a laptop or notebook computer, a tablet computer, a smart phone or a Personal Digital Assistant (PDA), a smart appliance, a video gaming console, an internet television, or other suitable processor-based devices. In one embodiment, the computing device 510 displays a web page to a user for composing an email. As the user starts to compose the email, intended recipients are identified from the body of the email. Corresponding email addresses are then fetched from an address book stored in the database 540. Further, the email addresses are automatically filled in appropriate fields, for example, To, Cc and Bcc. As a result, the user experiences a simple interface to compose emails. Additional embodiments of the computing device 510 are described in detail in conjunction with FIG. 6.

The database 540 stores the address book of the user. The address book includes email addresses of contacts that the user has previously communicated.

In one embodiment, the user of the computing device 510 desires to compose an email to one or more recipients. The computing device 510 displays a web page for composing the email through the network 530. However, the fields, for example, To, Cc and Bcc are hidden from the user. The user starts to compose the email by entering a salutation followed by a trigger. The trigger is a symbol and is identified by the identifying module 520. The trigger implies that alphabets that follow the trigger signify recipients of the email. For the alphabets that are entered by the user, email addresses of recipients including the alphabets are retrieved by the retrieving module 550 from the database 540. The email addresses are displayed in a list to the user. Subsequently, the user selects the recipient. In some embodiments, multiple recipients are selected. At this point, the email addresses are filled in appropriate fields. As a result, the user experiences a simple interface exclusive of the need to enter email addresses of recipients.

Figure 6:
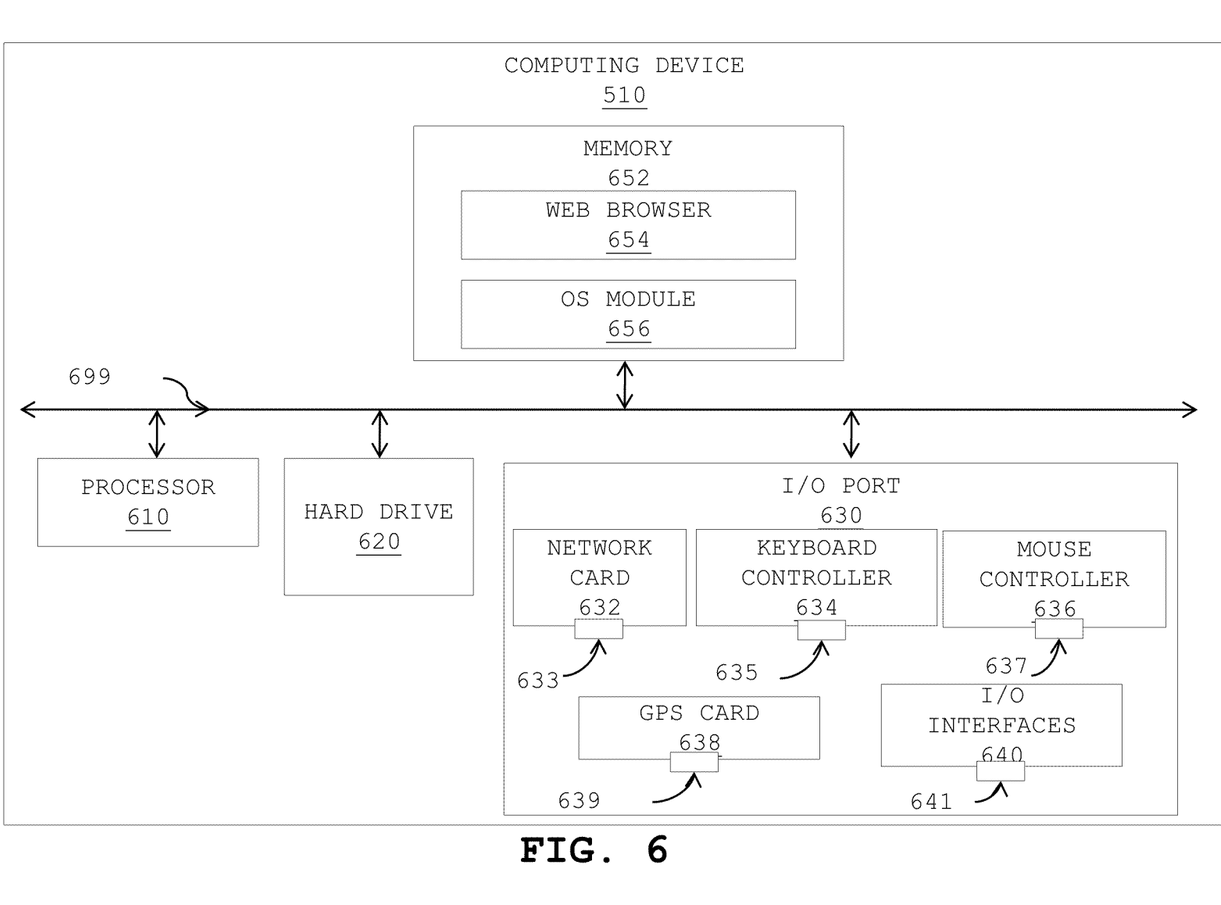
FIG. 6 is a block diagram illustrating an exemplary computing device, in accordance with one embodiment.

FIG. 6 is a block diagram illustrating an exemplary computing device, for example the computing device 510, in accordance with one embodiment. The computing device 510 includes a processor 610, a hard drive 620, an I/O port 630, and a memory 652, coupled by a bus 699.

The bus 699 can be soldered to one or more motherboards. Examples of the processor 610 includes, but is not limited to, a general purpose processor, an application-specific integrated circuit (ASIC), an FPGA (Field Programmable Gate Array), a RISC (Reduced Instruction Set Controller) processor, or an integrated circuit. The processor 610 can be a single core or a multiple core processor. In one embodiment, the processor 610 is specially suited for processing demands of location-aware reminders (for example, custom micro-code, and instruction fetching, pipelining or cache sizes). The processor 610 can be disposed on silicon or any other suitable material. In operation, the processor 610 can receive and execute instructions and data stored in the memory 652 or the hard drive 620. The hard drive 620 can be a platter-based storage device, a flash drive, an external drive, a persistent memory device, or other types of memory.

The hard drive 620 provides persistent (long term) storage for instructions and data. The I/O port 630 is an input/output panel including a network card 632 with an interface 633 along with a keyboard controller 634, a mouse controller 636, a GPS card 638 and I/O interfaces 640. The network card 632 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 633 is configured according to networking compatibility. For example, a wired networking card includes a physical port to plug in a cord, and a wireless networking card includes an antennae. The network card 632 provides access to a communication channel on a network. The keyboard controller 634 can be coupled to a physical port 635 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 636 can also be coupled to a physical port 637 (for example, mouse or USB port). The GPS card 638 provides communication to GPS satellites operating in space to receive location data. An antenna 639 provides radio communications (or alternatively, a data port can receive location information from a peripheral device). The I/O interfaces 640 are web interfaces and are coupled to a physical port 641.

The memory 652 can be a RAM (Random Access Memory), a flash memory, a non-persistent memory device, or other devices capable of storing program instructions being executed. The memory 652 comprises an Operating System (OS) module 656 along with a web browser 654. In other embodiments, the memory 652 comprises a calendar application that manages a plurality of appointments. The OS module 656 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 654 can be a desktop web browser (for example, Internet Explorer, Mozilla, or Chrome), a mobile browser, or a web viewer built integrated into an application program. In an embodiment, a user accesses a system on the World Wide Web (WWW) through a network such as the Internet. The web browser 654 is used to download the web pages or other content in various formats including HTML, XML, text, PDF, and postscript, and may be used to upload information to other parts of the system. The web browser may use URLs (Uniform Resource Locators) to identify resources on the web and HTTP (Hypertext Transfer Protocol) in transferring files to the web.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 802.11n). In one example, signals from the computer can be transferred, at least in part, wirelessly to components or other computers.

Advantageously, a relatively simple and natural web interface for composing emails is delivered to the user. Moreover, the web interface is specifically useful for laymen who do not like complicated forms. Further, the method simplifies address book creation by automatically recognizing nicknames and expected addressing. Furthermore, list creation and addition of names into the list are simplified.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
identifying, by a computing device, a trigger from a user in response to the user composing an electronic mail (email), the trigger comprising a symbol implying that the user is going to enter a recipient's name after the trigger and within the body of the email;
receiving, by the computing device, one or more alphabets subsequent to the trigger, the one or more alphabets implying a recipient of the email;
fetching, by the computing device, email addresses comprising the one or more alphabets from an address book corresponding to the user;
displaying, by the computing device, a list of the email addresses to the user; and
filling, by the computing device, appropriate fields in response to the user selecting one of the email addresses.

2. The method of claim 1, wherein the trigger is one of a symbol and a salutation.

3. The method of claim 1, wherein fetching the email addresses signifies possibilities of the recipient.

4. The method of claim 1, wherein the displaying is based on recency and frequency of subsequent emails sent by the user.

5. The method of claim 1, wherein the list includes email addresses of one or more groups of recipients.

6. The method of claim 5, further comprising: filling appropriate fields in response to the user selecting one of the groups of recipients.

7. The method of claim 1, wherein the fields are To field, Cc field and Bcc field.

8. The method of claim 1 and further comprising adding anchor tags in response to the user selecting the one or more recipients.

9. The method of claim 1, further comprising: creating a group of recipients while the user composes the email; and updating the address book constantly.

10. The method of claim 7, further comprising: adding one or more recipients to an existing group.

11. The method of claim 1, further comprising: inferring alternate names of the user and the recipient from content of the email; linking an appropriate email address to the alternate name in the address book; and filling appropriate fields in response to the user selecting one of the alternate names.

12. A non-transitory computer-readable storage medium that when executed by a processor, performs a method of inferring recipients while creating electronic mails, comprising:
identifying, by the processor, a trigger from a user in response to the user composing an electronic mail (email), the trigger comprising a symbol implying that the user is going to enter a recipient's name after the trigger and within the body of the email;
receiving, by the processor, one or more alphabets subsequent to the trigger, the one or more alphabets implying a recipient of the email;
fetching, by the processor, email addresses comprising the one or more alphabets from an address book corresponding to the user;
displaying, by the processor, a list of the email addresses to the user; and
filling, by the processor, appropriate fields in response to the user selecting one of the email addresses.

13. The medium of claim 12, wherein the trigger is one of a symbol and a salutation.

14. The medium of claim 12, wherein fetching the email addresses signifies possibilities of the recipient.

15. The medium of claim 12, wherein the displaying is based on recency and frequency of subsequent emails sent by the user.

16. The medium of claim 12, wherein the list includes email addresses of one or more groups of recipients.

17. The medium of claim 16, further comprising: filling appropriate fields in response to the user selecting one of the groups of recipients.

18. The medium of claim 12, wherein the fields are To field, Cc field and Bcc field.

19. The medium of claim 12 and further comprising adding anchor tags in response to the user selecting the one or more recipients.

20. The medium of claim 12, further comprising: creating a group of recipients while the user composes the email; and updating the address book constantly.

21. The medium of claim 16 and further comprising adding one or more recipients to an existing group.

22. The medium of claim 12, further comprising:
inferring alternate names of the user and the recipients from content of the email;
linking an appropriate email address to the alternate names in the address book; and
filling appropriate fields in response to the user selecting one of the alternate names.

23. A system comprising:
a web interface to receive one or more alphabets in response to a user composing an electronic mail (email);
an identifying module that identifies a trigger from the user, the trigger comprising a symbol implying that the user is going to enter a recipient's name after the trigger and within the body of the email; and
a retrieving module that retrieves email addresses of recipients from an address book of the user.

24. The system of claim 23 and further comprising a database that stores the address book corresponding to the user.

25. The system of claim 23, wherein the web interface displays a list of the recipients to the user.

* * * * *